United States Patent
Rexberg et al.

(10) Patent No.: US 9,215,120 B2
(45) Date of Patent: Dec. 15, 2015

(54) MULTI-BAND CREST FACTOR REDUCTION

(75) Inventors: Leonard Rexberg, Hasselby (SE);
Håkan Malmqvist, Skarpnäck (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 553 days.

(21) Appl. No.: 13/333,736

(22) Filed: Dec. 21, 2011

(65) Prior Publication Data

US 2013/0163512 A1 Jun. 27, 2013

(51) Int. Cl.
*H04L 27/26* (2006.01)
*H04B 1/00* (2006.01)
*H04B 1/04* (2006.01)

(52) U.S. Cl.
CPC .......... *H04L 27/2624* (2013.01); *H04B 1/0046* (2013.01); *H04B 1/0475* (2013.01)

(58) Field of Classification Search
None
See application file for complete search history.

(56) References Cited

U.S. PATENT DOCUMENTS

| | | | |
|---|---|---|---|
| 6,570,929 B1 | 5/2003 | Eriksson | |
| 6,754,285 B1 * | 6/2004 | Kiykioglu | 375/297 |
| 6,765,899 B1 * | 7/2004 | Lundh et al. | 370/342 |
| 7,266,354 B2 | 9/2007 | Jian et al. | |
| 7,313,373 B1 | 12/2007 | Laskharian et al. | |
| 7,792,200 B2 | 9/2010 | Molander | |
| 7,848,446 B2 | 12/2010 | Haartsen | |
| 2002/0181388 A1 * | 12/2002 | Jain et al. | 370/208 |
| 2004/0052314 A1 * | 3/2004 | Copeland | 375/296 |
| 2005/0118966 A1 | 6/2005 | Anvari | |
| 2005/0281345 A1 * | 12/2005 | Obernosterer et al. | 375/260 |
| 2007/0184813 A1 | 8/2007 | Pascht et al. | |
| 2010/0150256 A1 | 6/2010 | Morris et al. | |

FOREIGN PATENT DOCUMENTS

| | | |
|---|---|---|
| CN | 102271105 | 12/2011 |
| EP | 1 331 743 A1 | 7/2003 |
| WO | WO 2008/004923 | 10/2008 |

OTHER PUBLICATIONS

Transmittal and International Search Report mailed Sep. 11, 2013 in International Application No. PCT/SE2013/05114.
Written Opinion of the International Searching Authority mailed Sep. 11, 2013 in International Application No. PCT/SE2012/051124.
V. Vijayarangan et al., "An Overview of Techniques for Reducing Peak to Average Power Ratio and its Selection Criteria for Orthogonal Frequency Division Multiplexing Radio Systems", Journal of Theoretical and Applied Information Technology, Vol, No. 5, 2009, pp. 25-36.
European Search Report issued for Application No./Patent No. 12859824.0-1505/2795862 Jul. 3, 2015.

* cited by examiner

*Primary Examiner* — Christopher Crutchfield
(74) *Attorney, Agent, or Firm* — Patent Portfolio Builders, PLLC

(57) ABSTRACT

Clipping a widely-separated, multi-carrier signal is effectively performed without having to use a high sampling speed. Clipping is performed in a first stage at a combined signal level, but with a predetermined carrier separation of at least twice the channel bandwidth (2CBW), followed by repositioning the carriers at baseband zero frequency. After clipping, carriers are placed at their respective center frequencies with full carrier separation reintroduced in a second stage. Iterative clipping stages smooth out signal reshaping and re-settled amplitudes for combined carriers.

18 Claims, 14 Drawing Sheets

MULTI-BAND CREST FACTOR REDUCTION

TECHNICAL FIELD

The technology relates to signal transmission systems where there is a need to limit the signal peak-to-average power ratio. More specifically, the technology relates to signal peak limitation on widely-separated carriers intended to be transmitted simultaneously. Non-limiting example applications of the technology include telecommunication systems, such as those implementing standards like GSM, WCDMA, LTE or any other standard or combinations thereof.

BACKGROUND

Power amplifiers typically are assigned peak power level ratings. One risk is that an amplifier, i.e., normally the main transistor, breaks down if it is exposed to a high peak level. A second risk is that the amplifier itself has a non-linear behavior which may limit high output portions of the signal and include increased emission levels at frequencies outside an intended or allowed spectrum. Reducing power may potentially minimize these particular issues, but will create reduced efficiency levels for the radio equipment. Another example solution includes crest factor reduction (CFR) which can he implemented in a transmitter to reduce peak power in relation to the average power. This can be achieved by directly reducing the peak power by a baseband rearrangement of the baseband signal or by forcing the signal down at peak levels by clipping.

Clipping can be performed in a baseband signal configuration or on a combined signal. Clipping is a form of distortion that limits a signal once it exceeds a threshold. It may be described as hard, in cases where the signal is strictly limited at the threshold, producing a fiat cutoff which results in many high frequency harmonics and intermodulation distortion components.

In a digital system, the sampling rate for complex signals must be as high as the instantaneous signal bandwidth (IBW) is wide according to the well known Nyquist sampling theorem. Instantaneous signal bandwidth (IBW) is defined as the total bandwidth encompassing all the carriers intended for transmission. Single carrier signals, having a smaller channel bandwidth (CBW), e.g. 5 MHz or 20 MHz, do not require significant signal processing speeds. However, when a signal to be transmitted includes multiple carrier bands separated by a significant frequency bandwidth, for example 20-100 times the channel bandwidth (CBW), instantaneous signal bandwidth quickly becomes a detrimental factor in signal processing speeds.

Widely-separated carriers, i.e., having a carrier center frequency separation of much greater than twice the channel bandwidth of the carrier bands (>>2CBW), require processing speeds which are not practical for existing hardware. As an example, a widely-separated carrier signal including simultaneous transmission into 3GPP Band 1 (2110-2170 MHz) and Band 7 (2620-2690) means a maximum frequency separation of 580 MHz between the bands if an LTE carrier channel bandwidth of 20 MHz is used. Using this example, a matching sampling rate and processing speed of at least 580 MHz would be required, plus an additional spectrum margin. All together, the processing speed would exceed most hardware capabilities currently available.

Hard clipping of a signal to be transmitted also produces unwanted emissions outside the intended spectrum. Such emissions usually do not comply with requirements set up by standardization bodies. Therefore, filtering is often applied when hard clipping is used to introduce crest factor reduction (CFR) methods. Other CFR methods are also available which do not require hard clipping. For example, an article of M. R. Schroeder, "Synthesis of low-peak-factor signals and binary sequences with low autocorrelation, "IEEE Transactions on Information. Theory, vol. IT-16, pp. 85-89, January 1970, teaches a phase adjustment of each continuous-wave tone (CW-tone) used to decrease the peak-to-average ratio (PAR) of the signal without hard clipping it.

Clipping can be viewed as if a certain spectrum is added to the original spectrum of isolated carriers just covering the instantaneous bandwidth (IBW) of the carriers. The terms "adding a clipping spectrum" or "adding crest factor reduction signal components" will be used throughout the specification and drawings even though the actual signal amplitudes are limited or decreased by the clipping operation. The tolerated spectrum inside the desired transmission band is usually larger than the unwanted spectrum outside the carriers. Some examples of this are found in the telecom standards defined by 3GPP. Unwanted emissions are defined via specified allowed levels in certain frequency ranges, by adjacent channel leakage power ratio (ACLR, and via a spectrum mask, both defined just outside the channel bandwidth of the carriers. Inside the carriers, the unwanted emission requirement is often converted into an error vector magnitude (EVM) that must be below a certain limit.

CFR methods essentially address the question of how to compute the necessary extra spectrum that brings the PAR down to a predefined level but at the same time fulfill the requirement of achieving a low EVM figure and low unwanted emissions outside the carriers. Illustrative methods include, but are not limited to: 1) a method developed by Ericsson as described in R. Hellberg, "Apparatuses and a method for reducing peak power in telecommunications systems", PCT/SE2006/050237, hereby incorporated by reference and referred to hereafter as "Ericsson clipping algorithm", 2) peak windowing as described in an article by Mistry, Hiten N., "Implementation of a peak windowing algorithm for crest factor reduction in WCDMA", Master Of Engineering Thesis, Simon Fraser University, 2006, and 3) tone reservation as described in a thesis to J. Tellado, "Peak to Average Power Reduction for Multicarrier Modulation", Ph.D. thesis, Stanford University, 2000. Additional example methods are summarized in an article to V. Vijayarangan, R, Sukanesh, "An overview of techniques for reducing peak to average power ratio and its selection criteria for orthogonal frequency division multiplexing radio systems", Journal of Theoretical and Applied information Technology, Vol 5, No 5., pp 25-36, 2009.

All these methods try to satisfy common design goals for EVM and unwanted emissions. The technology described below can be used along with any of these methods, or others, both known and future, to provide crest factor reduction for multi-band signals.

A common outcome of existing solutions is that combined carriers before and after clipping are the same but also contain some clip distortion. This clip distortion is normally contained inside the carriers, hiding the unwanted spectrum emissions to the carriers. The amount of clip distortion, in relation to the carrier power itself, defines the error vector magnitude (EVM) of the signal. Existing telecommunication standards set a maximum EVM threshold to ensure satisfactory demodulation at the receiver end. This maximum EVM threshold may vary with bit rate and transmission configuration, e.g., supporting MIMO.

The technology described herein addresses the problem of clipping carriers in a multi-carrier system. As previously described, existing approaches may require a very high sampling speed in order for the method to work over the entire multi-carrier or combined signal. Clipping has to be made on the combined signal to be effective. Separate clipping on individual ones of the multiple carriers at a low speed requires a non-optimal testing step and introduces high signal latency and increased complexity.

What is needed is a solution that reduces sampling rates required to clip carriers in a multi-carrier system where the sampling speed would be too high for a practical solution to work.

SUMMARY

In an example embodiment, a method and apparatus is disclosed for crest factor reduction (CFR) of a multi-carrier signal, where each carrier of the multi-carrier signal has a respective center frequency and channel bandwidth (CBW). The method and apparatus include elements to position a baseband version of each of the carriers to a first frequency separation between adjacent carriers of at least 2 CBW, thereafter, combine the positioned carriers into a composite signal, clip the composite signal, reposition each carrier of the clipped composite signal back into a baseband version centered at zero frequency, and position each carrier at their respective center frequency.

In one aspect of the example embodiment, clipping includes adding clipping distortion signal components to each carrier of the clipped composite signal.

In another aspect of the example embodiment, after repositioning each carrier of the clipped composite signal back into a baseband version centered at zero frequency, clipping distortion is filtered outside each carrier's channel bandwidth.

In another aspect of the example embodiment, after clipping the composite signal, the clipping distortion is separated out, repositioned for each carrier to a baseband version centered at zero frequency, filtered outside each carrier's channel bandwidth and added to the respective base band version of each carrier centered at zero frequency.

In another aspect of the example embodiment, the clipping is iteratively performed.

In another aspect of the example embodiment, each carrier of the crest factor reduced multi-carrier signal is repositioned by either analog RF up-conversion, digital complex frequency tuning or by a combination of both at their respective center frequency. The carriers can be grouped into a plurality of frequency bands, each frequency band comprising a single carrier or a plurality of carriers, the edges of the frequency bands being separated in frequency by any value between 0 Hz and several GHz.

In another aspect of the example embodiment, the multi-carrier signal includes three or more carriers.

Figure If illustrates a phasor representation of carriers C1, C2 and C3 showing phasor C3 rotation relative C2 at maximum of combined amplitude for C1 and C2.

Figure 12:
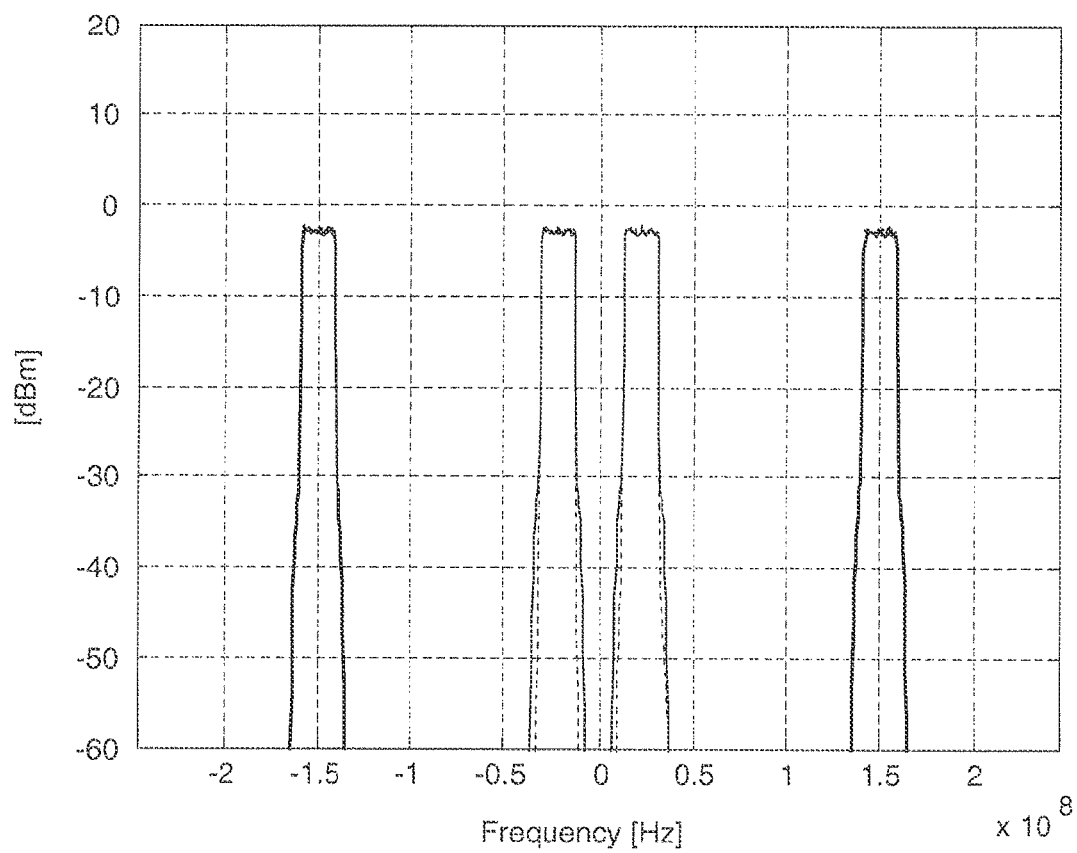

FIG. 12 illustrates a graph of carriers C1 and C2 at reference position (center) and at final positions (left and right).

Figure 13:
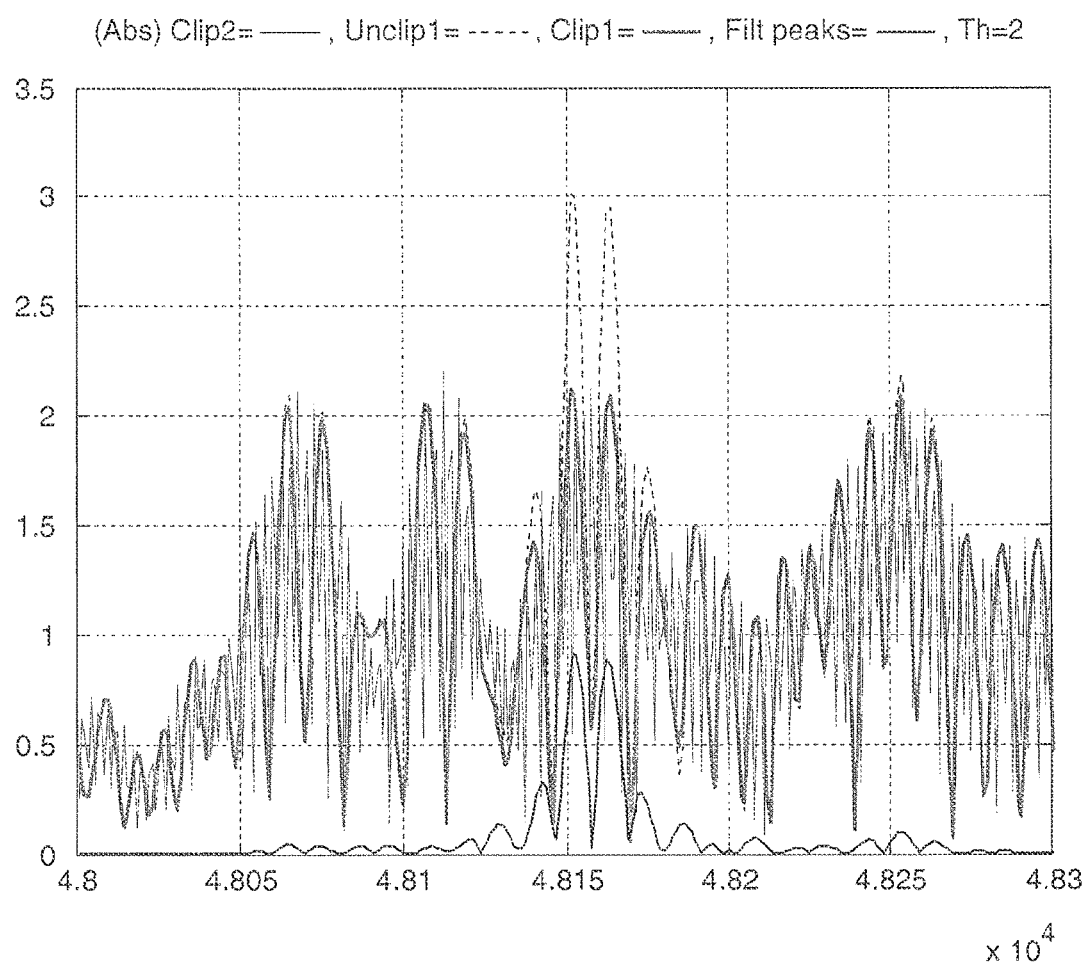

FIG. 13 illustrates a graph of absolute values of clipped signals at carrier reference position (Clip 1) and at final carrier positions (Clip 2).

Figure 14:
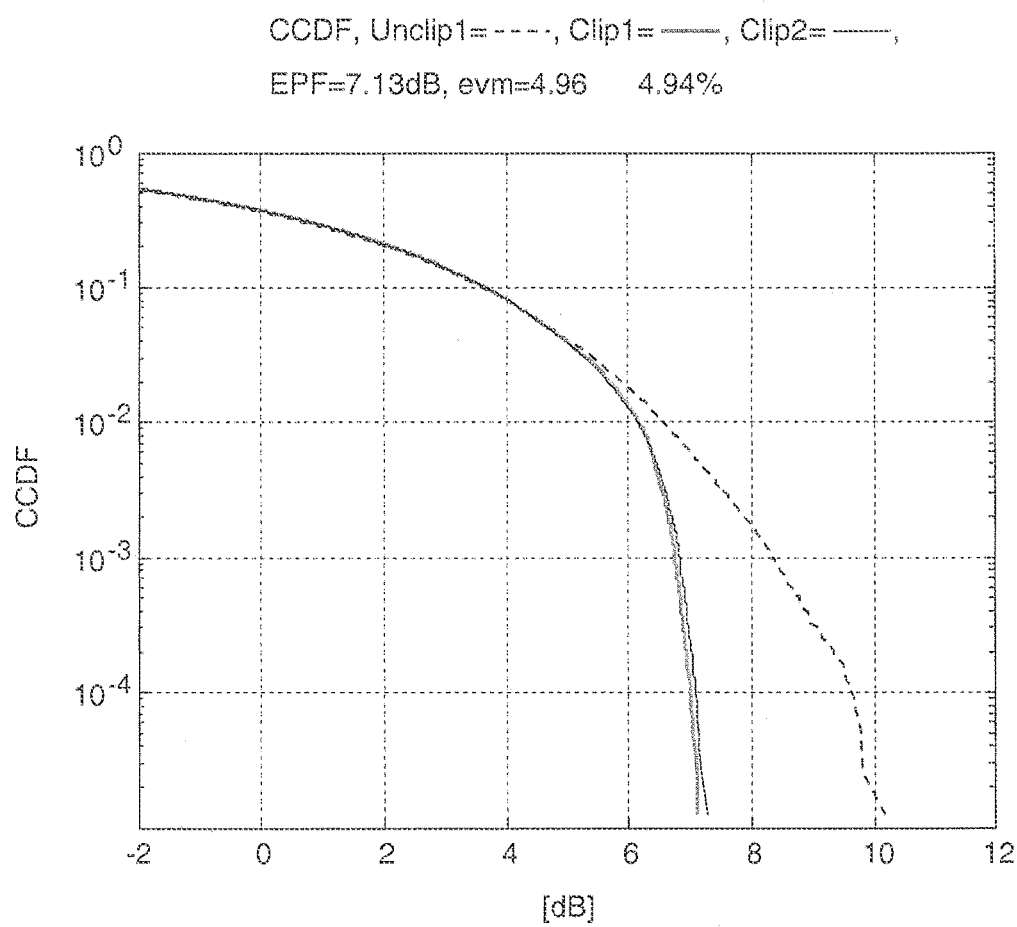

FIG. 14 illustrates a graph of CCDF (Complementary Cumulative Distribution Function) for the clipped signal at reference carrier position (Clip 1) and final carrier positions (Clip 2). Also illustrated is the CCDF or the unclipped signal.

DETAILED TECHNICAL DESCRIPTION

The following description sets forth specific details, such as particular embodiments for purposes of explanation and not limitation. But it will be appreciated by one skilled in the art that other embodiments may be employed apart from these specific details. In some instances, detailed descriptions of well known methods, nodes, interfaces, circuits, and devices are omitted so as not obscure the description with unnecessary detail. Those skilled in the art will appreciate that the functions described may be implemented in radio communications circuitry (e.g. in a transmitter) with a variety of crest factor reduction methods using hardware circuitry (e.g., analog and/or discrete logic gates interconnected to perform a specialized function, ASICs, PLAs, etc.) and/or using software programs and data in conjunction with one or more digital microprocessors or general purpose computers. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Non-limiting example embodiments of the technology described in this application may be used to improve signal quality in any transmission system. The transmission system may be part of an existing or future network using various protocols and noise handling requirements, for example CDMA, WCDMA, HSPA, SC-FDMA, OFDMA, LTE, or a mixture thereof, etc.

Baseband is defined as a signal that has undergone modulation and channeling processing except conversion to an analog signal, upconversion to an RF frequency, and amplification for final transmission by an antenna.

Figure 1:
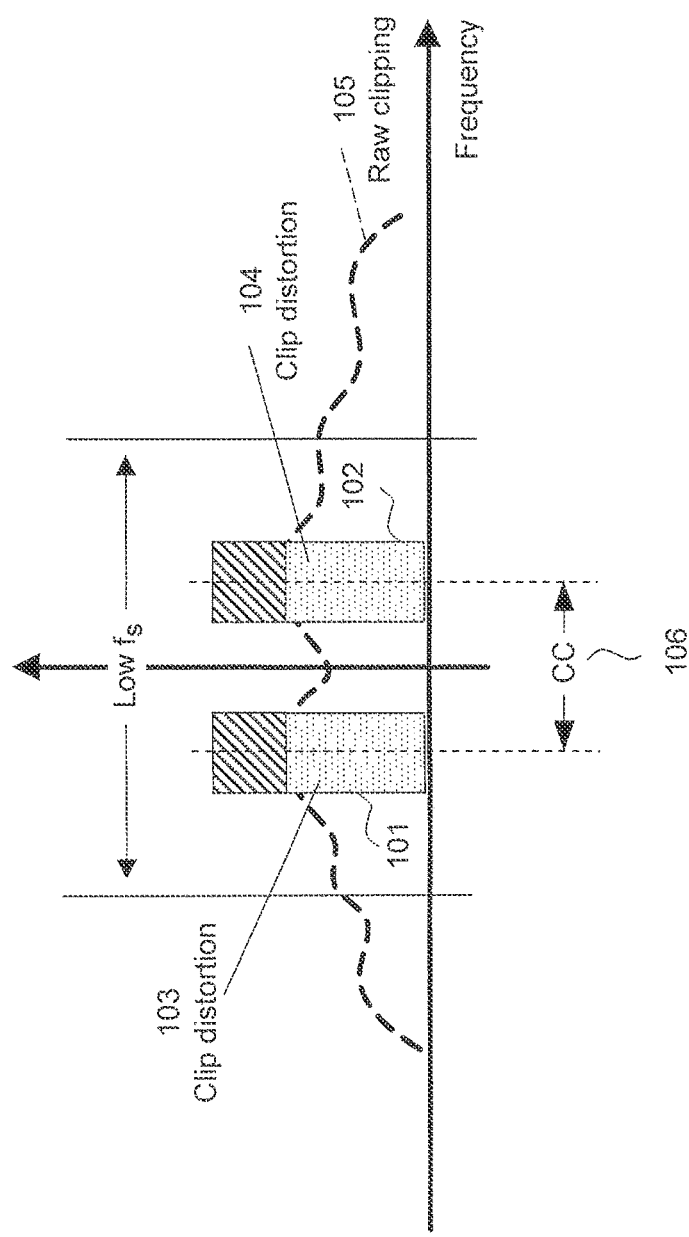
FIG. 1 is a graph of an exemplary signal format illustrating two carriers that undergo hard clipping.

FIG. 1 is a graph of an exemplary signal format illustrating a multi-band signal configuration with two carriers (101 and 102), separated by a center carrier (CC) frequency separation 106, that undergo hard clipping 105 (labeled "raw clipping", i.e., without smoothing). Carriers 101 and 102, when clipped, retain clipping distortion (103 and 104) within their respective channel bandwidths (101 and 102).

Figure 2A:
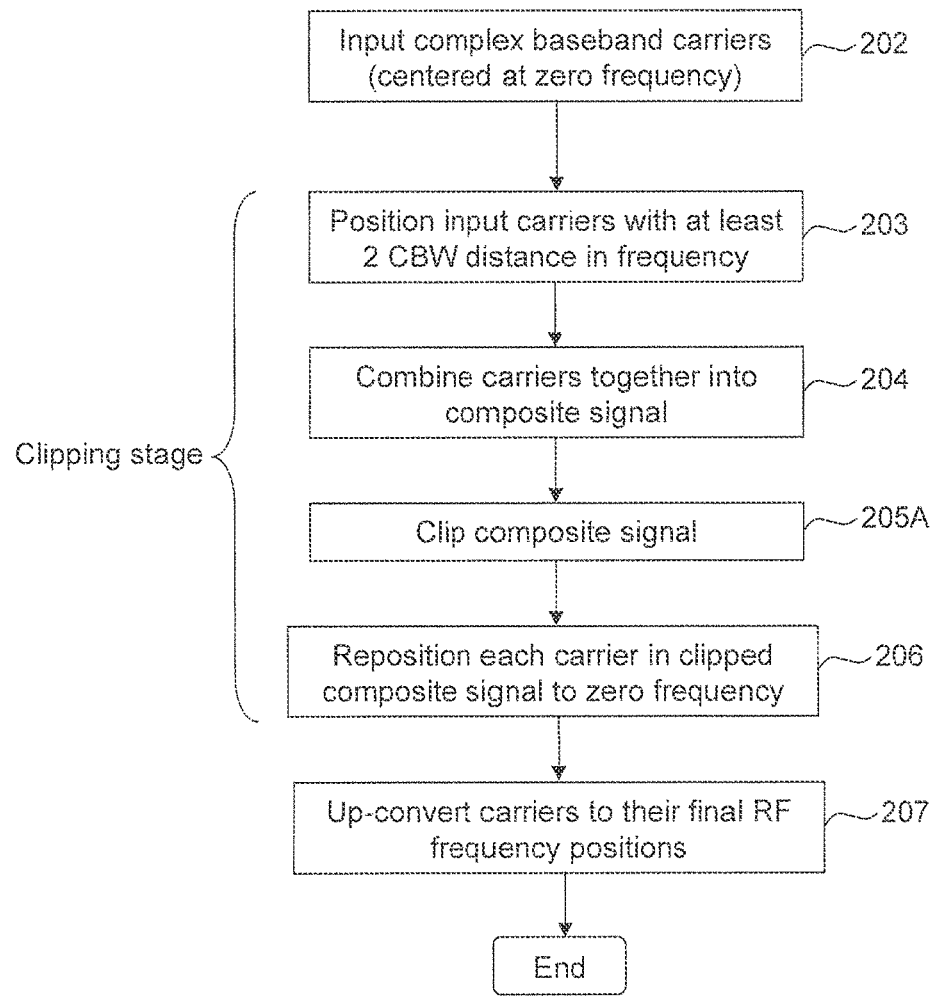
FIGS. 2A and 2B illustrate high level flow charts for multi-band clipping with example clipping algorithms.
Figure 2B:
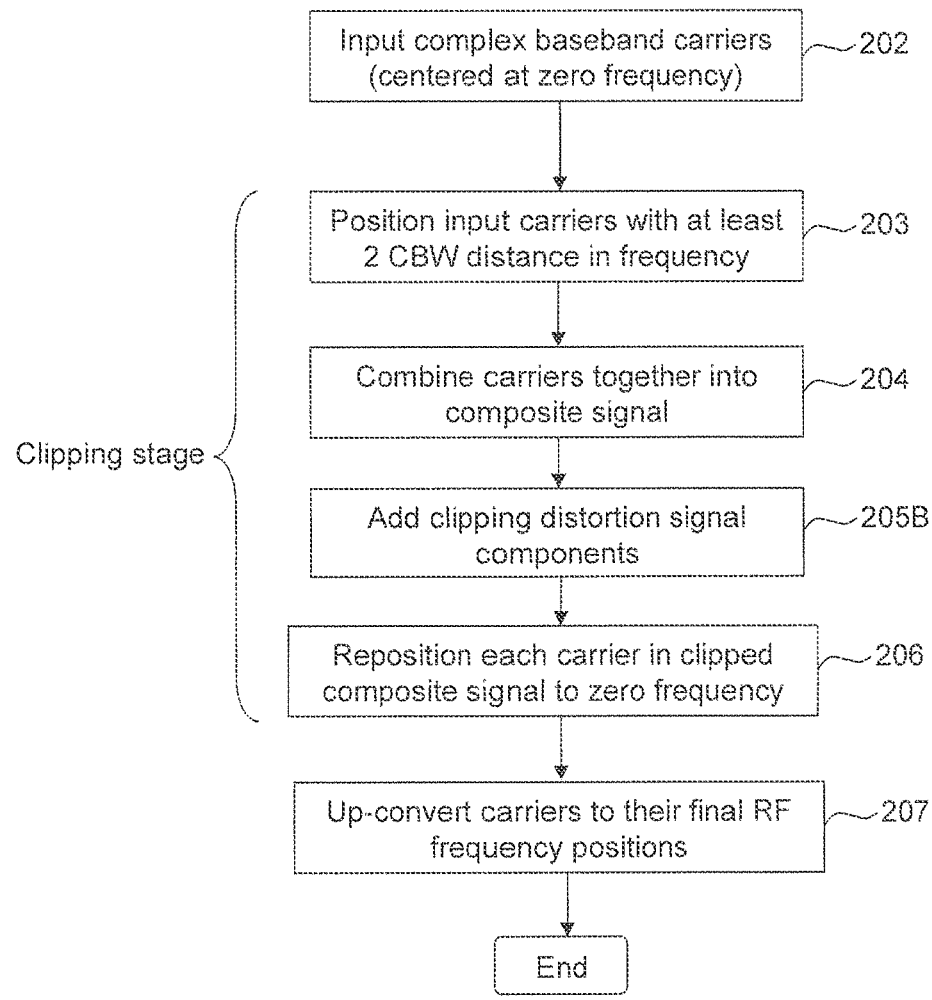

An example method and system are now described that eliminate this clipping problem in a multi-band system with widely-separated carriers. FIGS. 2A and 2B illustrate high level flow charts for multi-band clipping with example clipping algorithms. In step 202, complex baseband carriers, centered on zero frequency, are input into a clipping stage (steps 203-205). (Complex baseband signals is a common nomenclature in digital signal processing and expresses the general property of any signal having a phase and an amplitude (in polar notation) expressed in rectangular (Cartesian) form, i.e., the signal expressed as a combination of having a real part and an imaginary part I+jQ, where the I-part is called the In-phase component and the Q-part is called the Quadrature-phase component.) In step 203, the input carriers are positioned at a predetermined frequency separation of at least 2CBW, preferably at or near 2CBW. (predetermined frequency separation is defined as an arbitrary frequency separation of at least 2CBW but also being at most less than the sampling frequency minus 2CBW. This constitutes a temporary frequency separation that only exists when calculating the proper clip distortion to be added to each carrier.) In step 204, the positioned carriers are combined into a composite signal. (The frequency positioning of the carriers can be performed by complex numerically controlled oscillator (NCO) multiplication and the combination into a composite signal is performed by complex addition of the frequency-shifted carrier signals.) In step 205A, clipping is performed on the composite signal at the predetermined frequency separation, followed by, in step 206, repositioning the carriers to zero frequency. In 207, placement to final carrier positions is performed, e.g., to widely separated frequency positions constituting separate operating frequency bands (dual-band or multi-band configurations). The final RF position is accomplished through well known methods, such as RF up-conversion or Direct RF up-conversion by use of high speed DACs. The specific method is not further discussed herein since it does not impact the technology described for multi-band clipping. In step 205B of FIG. 2B, clipping distortion signal components are added to each carrier of the composite signal e.g., by the method of peak windowing.

Figure 3:
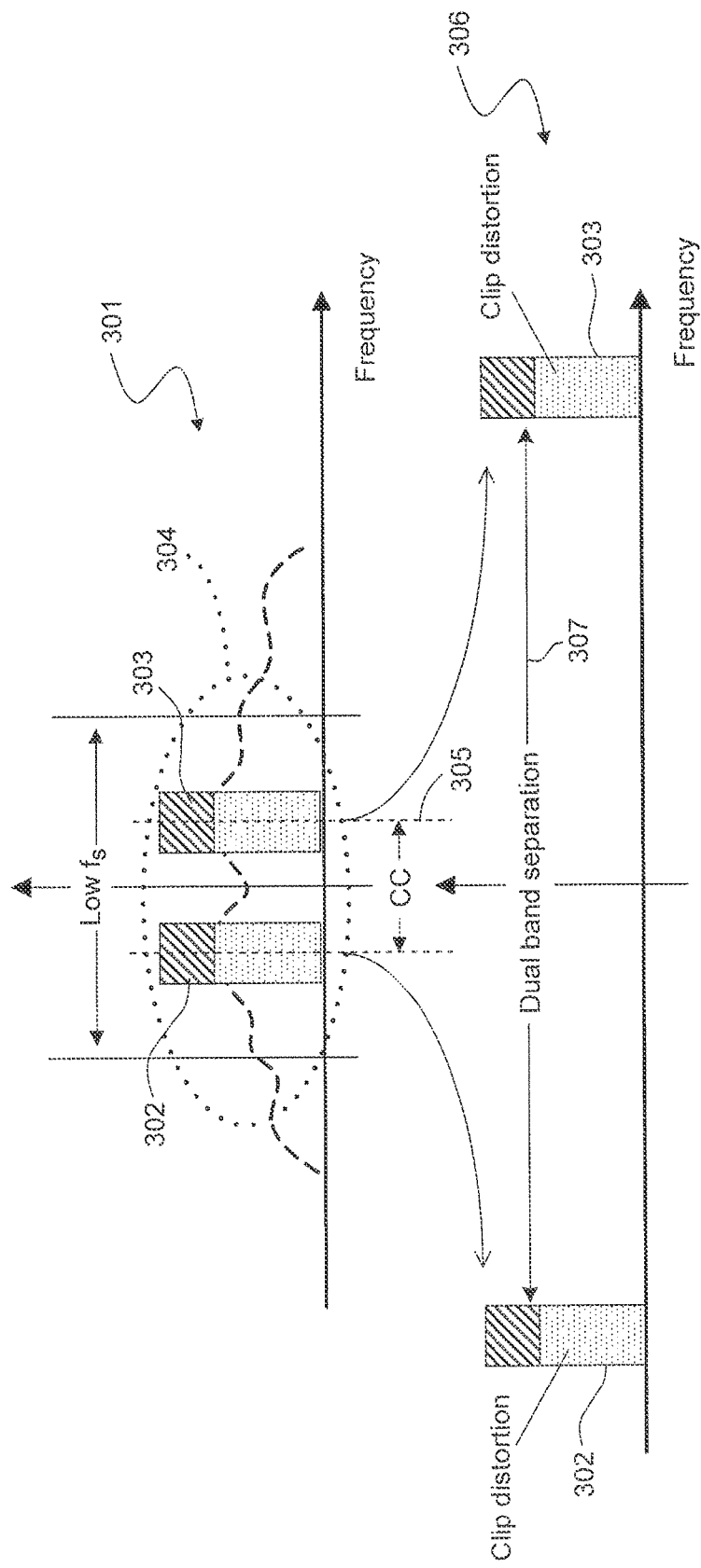
FIG. 3 is a graph of the steps illustrated in FIGS. 2A and 2B including frequency tuning of carriers into final carrier positions.

FIG. 3 is an example diagram of the method shown in FIGS. 2A and 2B. The diagram includes an upper portion 301 and lower portion 306. Upper portion 301 illustrates a first carrier band 302 and second carrier band 303 positioned at a predetermined center carrier (CC) separation 305 of at least 2CBW, preferably at or near 2CBW and clipped as combined carriers 304 (composite signal). Lower portion 306 illustrates the post-clipped carriers, including channel clipping distortion, being repositioned to a dual band separation 307 wider than 2BW (e.g., widely-separated carrier configuration).

Figure 4:
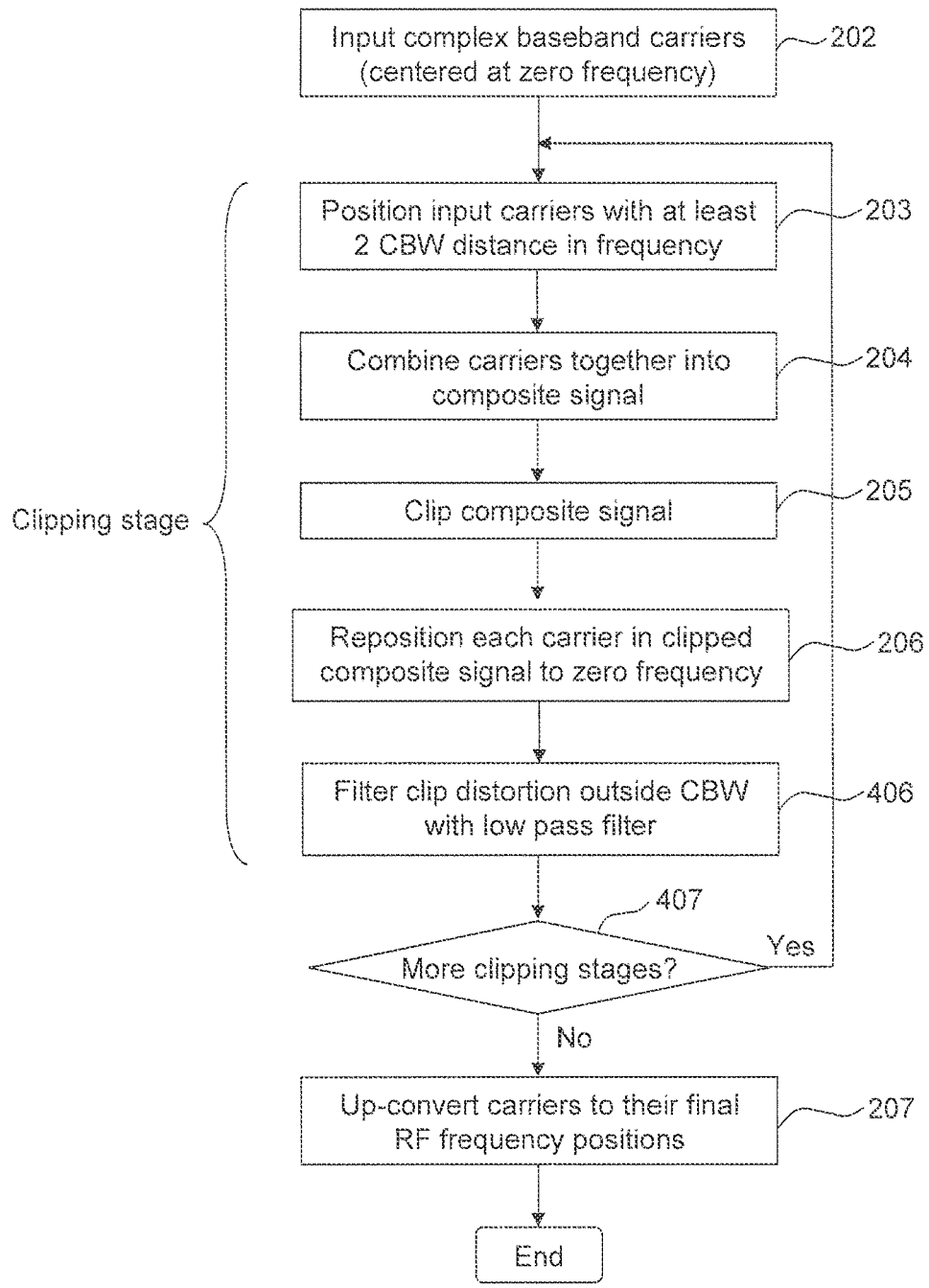
FIG. 4 illustrates a modified FIG. 2A flow chart for multi-band clipping with an example clipping algorithm.

FIG. 4 is another example method similar to that illustrated in FIG. 2A with two additional steps 406 and 407. Step 406, recognizes that clipping produces unwanted clipping distortion outside the channel bandwidth (CBW) and removes that distortion by filtering the clip distortion outside the CBW, e.g., with a low pass filter. A smoother implementation, in terms of signal reshaping and re-settled amplitudes, may be achieved via step 407 which iteratively performs additional clipping stages.

Figure 5:
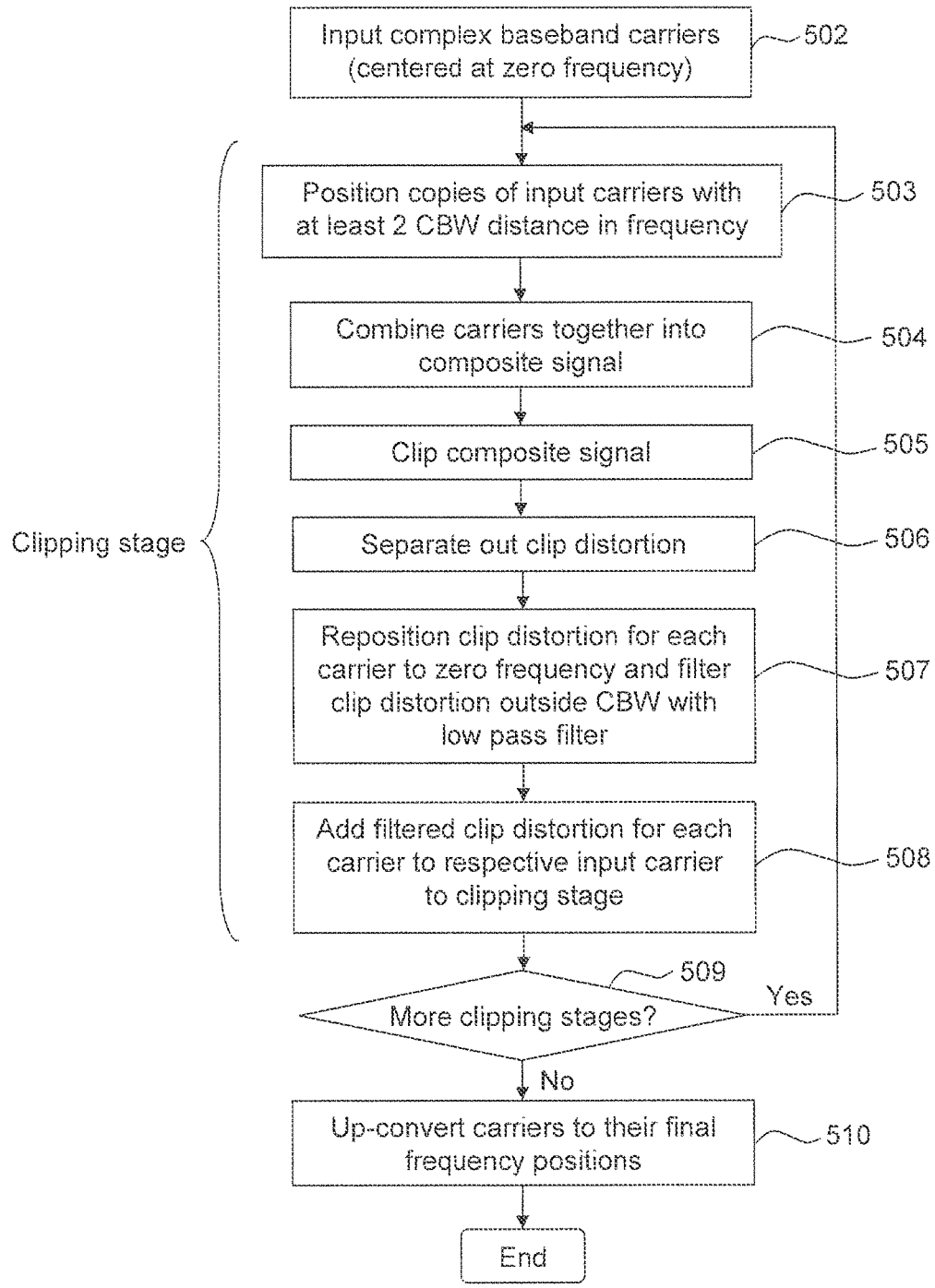
FIG. 5 illustrates an example implementation using a modification of an Ericsson clipping algorithm.

FIG. 5 illustrates an example implementation using a modification of the Ericsson clipping algorithm. In step 502, the baseband carriers, centered at zero frequency, are input into clipping steps 503-508. In step 503, copies of the input carriers are positioned at a predetermined frequency separation of least 2CBW, preferably at or near 2CBW. In step 504, the positioned carriers are combined into a composite signal. In step 505, clipping is performed on the composite signal at the predetermined frequency separation. Clipping produces clipping distortion, and therefore, in step 506, the produced clipping distortion is separated out. (The process of clipping distortion being separated out constitutes extracting the remainder when subtracting the clipped signal from the unclipped composite signal.) In step 507, the separated clipping distortion of each carrier is repositioned to zero frequency and clipping distortion outside the channel bandwidth (CBW) filtered with a low pass filter and then in step 508, the filtered distortion for each carrier is added to input carriers 502. To achieve a smoother implementation, in terms of signal reshaping and re-settled amplitudes, step 509 iteratively performs additional clipping stages. Step 510 provides separation of the carriers to carrier positions where they are to be placed in, for example, a widely-separated configuration, with final RE position accomplished through, well known methods, such as RE up-conversion or Direct RE up-conversion by use of high speed DACs.

Figure 6:
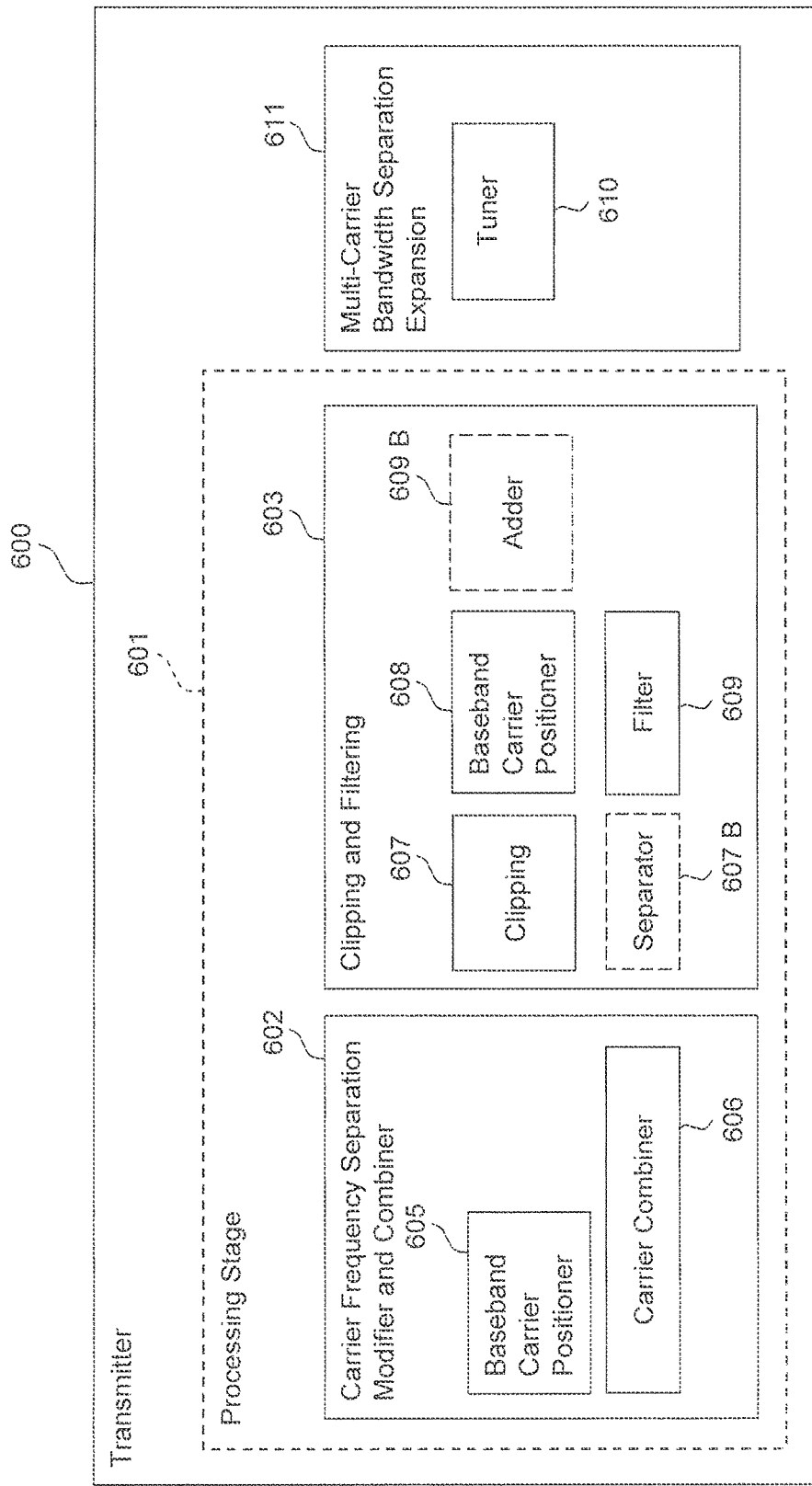
FIG. 6 illustrates an example transmitter implementing various stages of the technology described herein.

FIG. 6 illustrates a transmitter 600 implementing various stages of the technology described herein. Transmitters are well known and consist of many known elements as would be apparent to one skilled in the art. As such, the specific circuitry and power elements will not be described in detail herein. However, in an example implementation, the transmitter will have at least processing circuitry configured as: processing stage 601, including carrier frequency separation modifier and combiner section 602 and clipping and filtering section 603, and a multi-carrier bandwidth separation expansion stage 611. The carrier frequency separation modifier and combiner 602 include at least a baseband carrier positioner 605, and carrier combiner 606. Stage 602 implements at least the baseband input, carrier separation, and composite carrier signal functions described above. Clipping and filtering stage 603 includes a clipping element 607, a baseband carrier positioner 608, and a filter 609. Additionally, it may also include a clipping distortion separator 607B and an adder 609B. Stage 603 implements at least the clipping and clip distortion handling described above, including repositioning to baseband zero frequency. Stage 611 comprises a tuner 610, for example to separate the carriers to the carrier positions where they are to be placed (e.g., a widely-separated configuration), and provide additional fine tuning of RF position accomplished through well known elements, such as RF up-converter or Direct RF up-converter by use of high speed DACs in the implementation illustrated in FIGS. 4 and 5, processing stage 601 may optionally be iteratively used to provide a smoother implementation in terms of signal reshaping and re-settled amplitudes.

Figure 7:
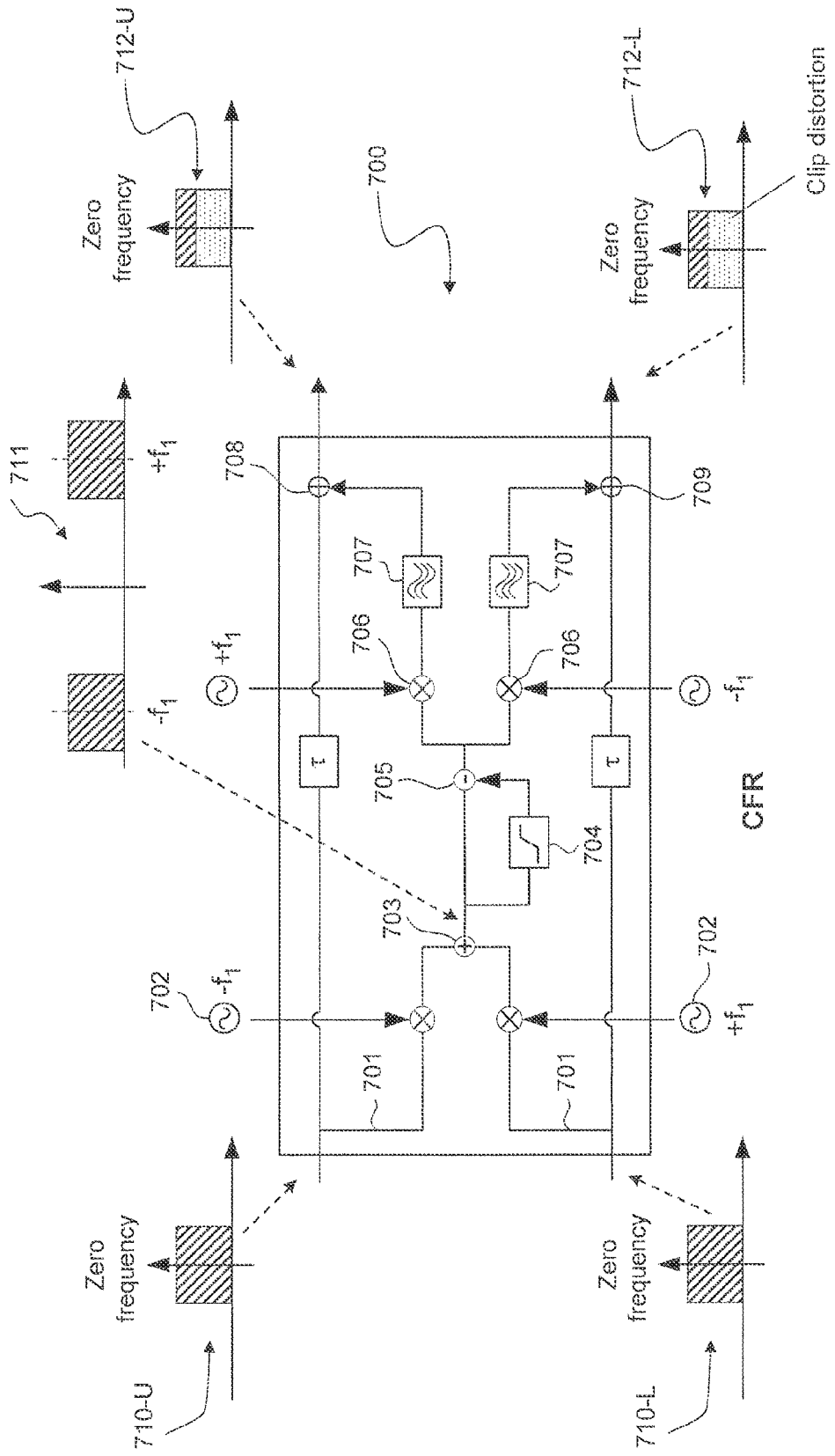
FIG. 7 illustrates an example circuit diagram illustrating a single clip stage adding clip distortion to two carriers placed at zero-frequency baseband.

FIG. 7 illustrates an example clipping circuit 700 for implementing the method of clipping in FIG. 5 with the clip distortion filtered out from a hard clipping stage and confined to the carrier itself. In a first stage, copies 701 of baseband versions (i.e. centered at zero frequency) of upper carrier signal 710-U and lower carrier signal 710-L are frequency shifted 702 to a predetermined frequency and combined together 703 to form a composite signal 711 with a carrier center separation of at least 2BW. This composite signal is then clipped in stage 704. The clipped peak signal is separated out in 705 and contains the clipping distortion for the carriers which is then shifted back into upper and lower signals centered around zero frequency in stage 706. The separated signals are filtered by low pass filters in stage 707. The remaining clipping distortion is added to both the upper carrier 710-U in stage 708 and lower carrier 710-L in stage 709 producing separated carriers 712-U and 712-L with clipping distortion within the carrier band.

Figure 8:
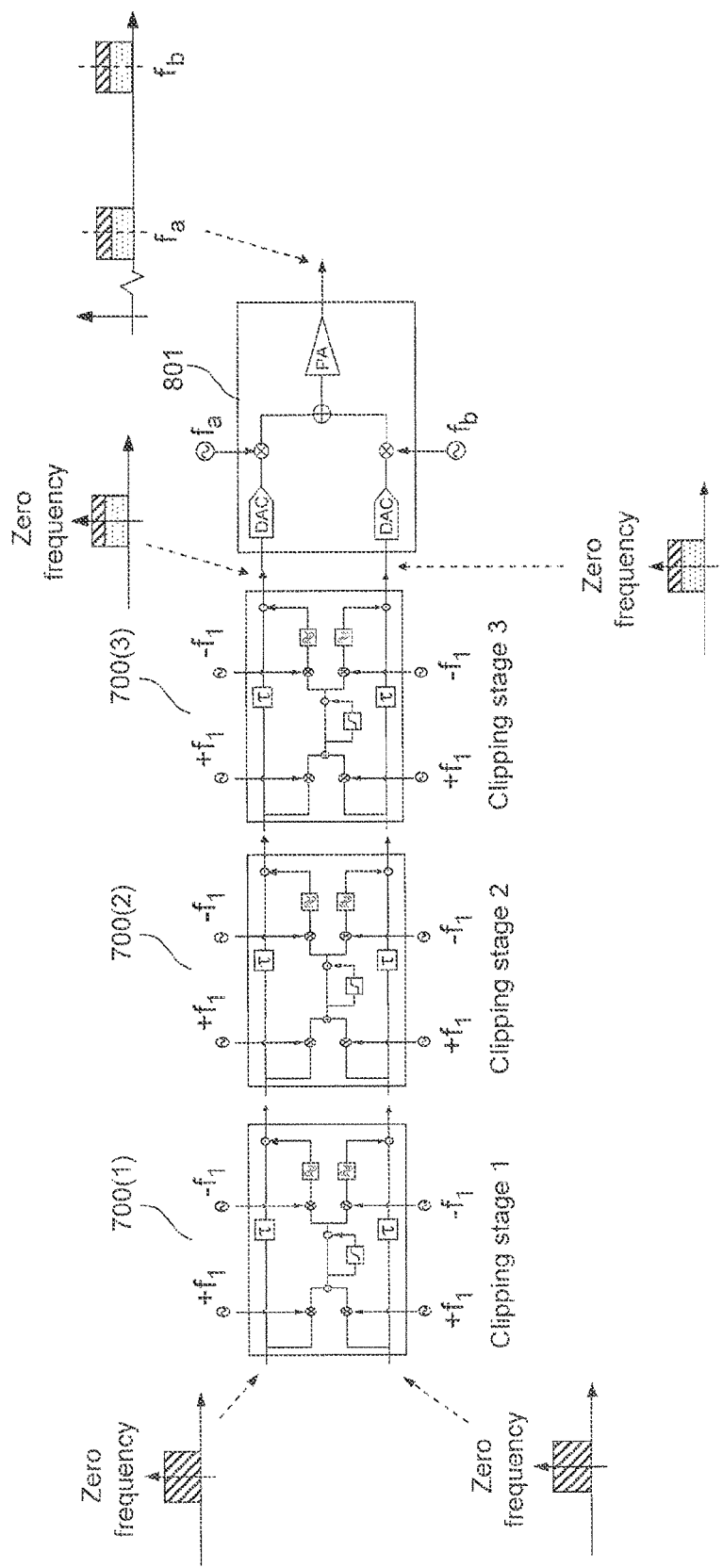
FIG. 8 illustrates an example circuit diagram illustrating several of the clip stages of FIG. 7 in a cascade formation followed by analog RF up-conversion.

FIG. 8 illustrates the circuit 700 of FIG. 7 replicated in series as three clipping stages 700(1), 700(2), and 700(3) to achieve a smoother implementation as previously described. In this example of two carriers, these carriers may then be placed into their relative frequency positions by analog RF up-conversion in tuner 801 by methods well known to those skilled in the art.

Figure 9:
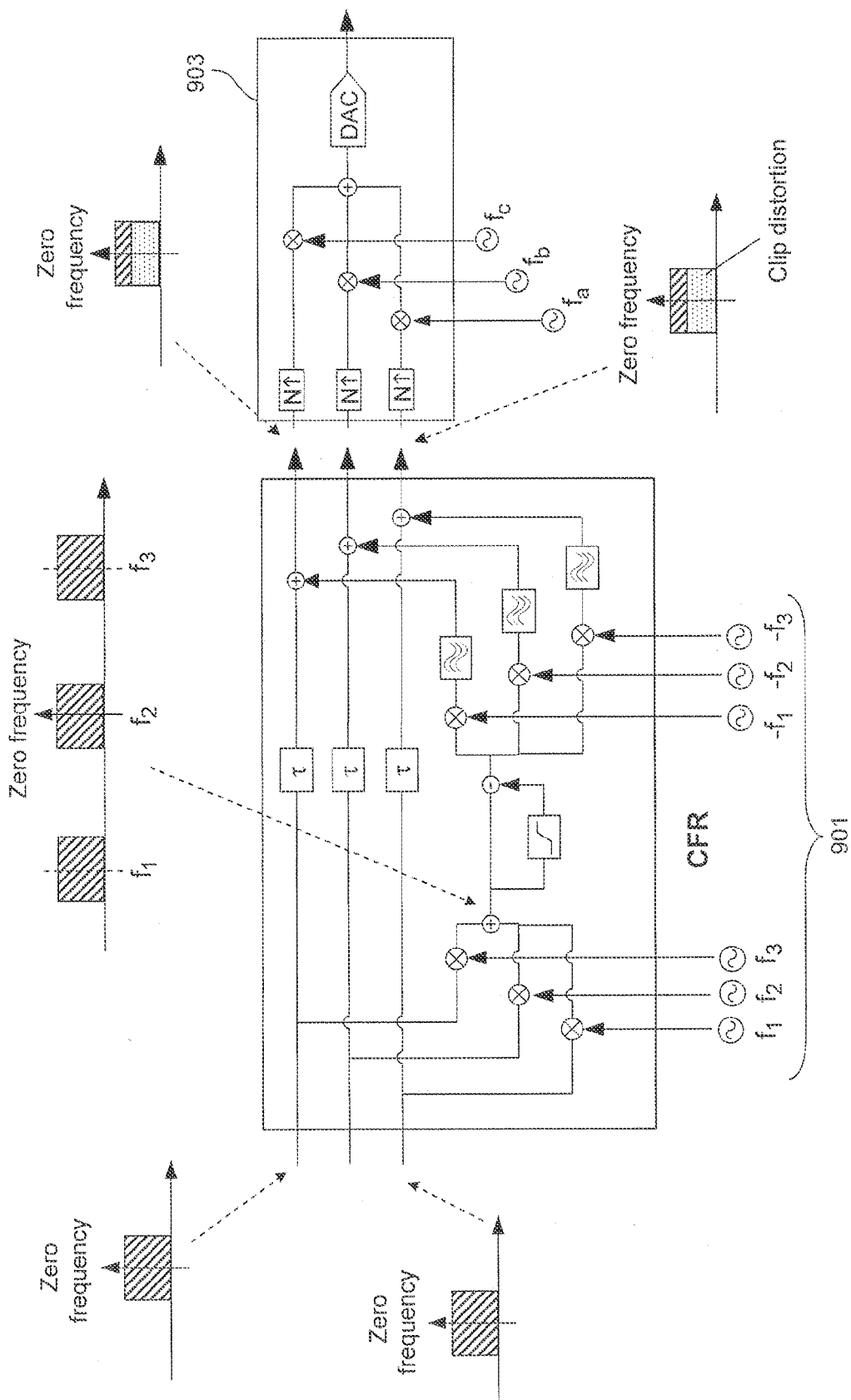
FIG. 9 illustrates an example circuit diagram illustrating a single clip stage showing added clip distortion to three carriers placed at zero-frequency baseband followed by digital complex frequency tuning positioning each carrier at their respective center frequency.

The two-band solution as shown in FIGS. 7 and 8 is equally applicable for three or even more bands. For example, FIG. 9 illustrates a three-band solution. Three bands of carrier frequencies 901 include additional carrier f3 added to the circuit configuration of FIG. 7. One skilled in the art of signal processing could continue to expand the process to support a multitude of additional bands. The circuit also includes separation of the carriers to the carrier positions where they are to be placed 903 (e.g., in a widely-separated, three band configuration), with final RF position accomplished through well known methods of up-sampling and digital complex frequency tuning.

To show some of the advantages of the technology described herein, an example is presented where two LTE carriers are clipped to a certain value, and a crest factor or peak-to-average ratio (PAR), in the form of a complementary cumulative distribution function (CCDF) curve, is compared with the case of high frequency separation. Initially, the carriers are placed relatively close to each other (e.g. 2BW frequency separation), combined into a composite signal, clipped, and then using the resulting carriers, including their clipping distortion, used to construct two carriers that are widely-separated (>>2CBW).

An explanation of the theory behind multi-carrier clipping follows. Consider two base band carriers $C_1(t)=A_1(t)e^{j\Phi_1(t)}$ and $C_2(t)=A_2(t)e^{j\Phi_2(t)}$ whose complex modulation of amplitude and phase is represented by the momentary values of A(t) and $\phi(t)$. Separating the two carriers by $\Delta\omega$ around a center frequency of $\omega_0$ gives the following expression for the combined carriers $$C(t) = e^{j\omega_0 t}\left(C_1(t)e^{-j\frac{\Delta\omega}{2}t} + C_2(t)e^{j\frac{\Delta\omega}{2}t}\right) \qquad \text{Equation 1}$$

Note that t is only the carrier separation $\Delta\omega$ and the complex base band modulations C1(t) and C2(t) that affects the total momentary amplitude of the combined carriers, and not the common offset frequency $\omega_0$ (also can be set to zero)

In order to more clearly see the effect of changing the frequency separation, rearrange Equation 1 and refer all frequencies to the lowest carrier frequency $\omega_0-\Delta\omega/2$.

$$C(t) = e^{j(\omega_0-\frac{\Delta\omega}{2})t}(C_1(t) + C_2(t)e^{j\Delta\omega t}) \qquad \text{Equation 2}$$

Figure 10:
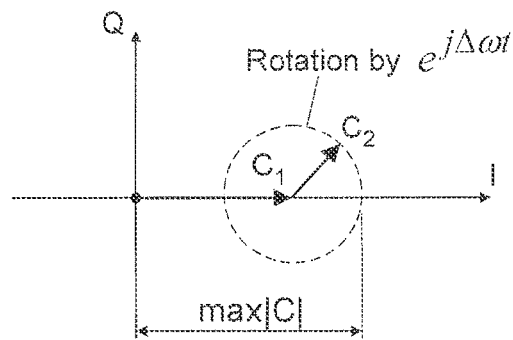
FIG. 10 illustrates a phasor representation of carriers C1 and C2 showing phasor C2 rotation relative C1 and maximum of combined amplitude.

Ignoring the common offset frequency $\omega_0-\Delta\omega/2$, it is clear that it is the carrier separation $\Delta\omega$ and the two carriers base band modulations C1(t) and C2(t) that affect the total combined momentary amplitude and C2(t) phasor position relative to the now fixed phasor C1(t). Phasor is defined as a vector representation in the complex plane with the angle to the x-axis corresponding to the phase of the complex signal, and the length of the vector corresponding to the amplitude (or envelope) of the complex signal. A phasor representation of C1(t) and C2(t) is shown in FIG. 10.

It is clear that if $\Delta\omega$ is much greater than each carrier bandwidth CBW the phasor $e^{j\Delta\omega t}$ will rotate much faster than C1(t) will change relative to the phasor C2(t) (also considered stationary on the time scale 2/CBW). This also means that as long as $\Delta\omega$>>CBW, the actual value of $\Delta\omega$ is not important for the maximum combined carrier amplitude max|C| (on the time scale 2/CBW), The consequence of this is that, if clipping of the combined carriers (affecting the amplitudes of both C1 and C2) is performed at a reference carrier separation ($\Delta\omega_r$), and the carriers are shifted to a new carrier separation ($\Delta\omega_n$), the maximum combined carrier amplitude max|C| will not change. This proves that the proposed multi-carrier clipping works for two carriers. The criterion $\Delta\omega$>>CBW is not critical and can, in practice, be relaxed to $\Delta\omega$>2CBW.

Figure 11:
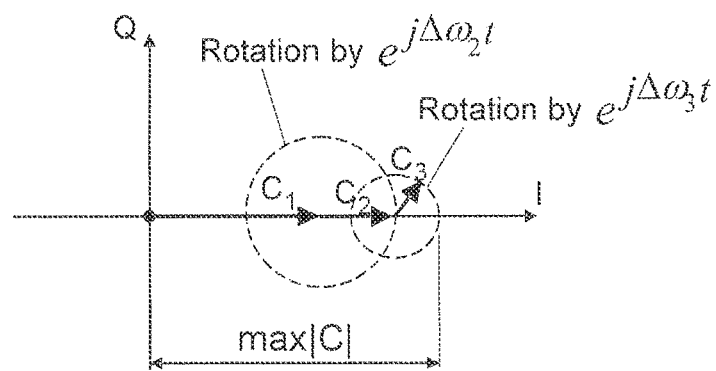

The argument is extendable to a larger number of carriers, for example, three carriers as is shown in Equation 3 and FIG. 11, or even an arbitrary number of carriers, fulfilling the requirement for enough separation at a reference carrier configuration, where the clipping is performed. With three or more carriers, the reference carrier configuration should also fulfill the criterion of not placing distortion components from clipping of two of the carrier components into any other (3rd order IM). For the three carrier example below, a reference frequency is now set as the frequency position of the first carrier C1.

$$C(t)=e^{j\omega_0 t}(C_1(t)+C_2(t)e^{j\Delta\omega_2 t}+C_3(t)e^{j\Delta\omega_3 t}) \qquad \text{Equation 3}$$

A two carrier example from Matlab simulations of multi-band clipping is shown in FIG. 12, FIG. 13, and FIG. 14. Two 20 MHz bandwidth LTE carriers are separated by 44 MHz in a composite configuration, clipped and then separated by 300 MHz in a final dual band configuration. Note that the maximum of the envelope in FIG. 13 is essentially the same for the reference configuration and for the final configuration on the time scale of the carrier modulation. The CCDFs in FIG. 14 for the reference configuration (Clip 1) and for the final configuration (Clip 2) are virtually identical as is expected.

There is also another reason for having enough separation of the carriers in the composite configuration for clipping. The clipping process normally involves a hard clipping stage followed by some filtering in order to confine the generated IM products to within the carrier bandwidth (CBW). Without filtering, the third order products will extend out to one CBW on either side of each carrier. Higher order nonlinearities will extend even further out.

In order not to have any third order IM products to fall within the next carrier, the separation between the carrier edges need to be at least one CBW, implying a center-to-center separation of at least 2CBW. With three or more carriers, the separations should also he arranged so third order IM products from clipping of two of the carriers do not fall within any other carrier. This is consistent with the result of the Matlab simulations, meaning that higher order nonlinearities than the third have reached sufficiently low levels not to contribute significantly to resulting EVM of each carrier, nor to the crest factor of the combined carrier configuration.

An example advantage of the method and apparatus described herein for multi-band clipping is that a multitude of clipping algorithms can be extended into multi-band clipping using the technology described herein. Depending on the direct implementation of the clipping algorithm, different adaptations and extensions have to be provided as is well known to one skilled in the art of complex frequency tuning and digital filtering.

The first step is to carefully arrange the carriers into a composite configuration with enough spacing between the carriers in order not to allow third order IM products from clipping operations to fall inside the frequency ranges of any of the other carriers or so far outside half the sampling frequency that IM products fold back into any carrier frequency range. The total IBW for the reference configuration (e.g. 3CBW for a two carrier configuration) thus sets the minimum sampling speed Fs (e.g. Fs>5CBW for a two carrier configuration) required for this first step of the multi-band clipping method.

The second step is the placement of the clipped carriers into a multi-band configuration. Here the second advantage is revealed, namely that the required sampling speed for the clipping step is not at all dependent On this second step of setting the actual multi-band configuration, and does not require a sampling speed commensurate with the, often high, IBW for this configuration. As shown earlier, the clipped signal properties (EVM and EPF) from the first step are preserved when going from the composite carrier configuration to the actual multi-band configuration. The wanted multi-band configuration can be implemented with any of a number of well known methods (e.g. analog RF up-conversion).

Although various embodiments have been shown and described in detail, the claims are not limited to any particular embodiment or example. None of the above description should be read as implying that any particular element, step, range, or function is essential such that it must be included in the claims scope. The scope of patented subject matter is defined only by the claims. The extent of legal protection is defined by the words recited in the allowed claims and their equivalents. All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology described, for it to be encompassed by the present claims. Furthermore, no embodiment, feature, component, or step in this specification is intended to be dedicated to the public regardless of whether the embodiment, feature, component, or step is recited in the claims.

The invention claimed is:

1. A method for crest factor reduction (CFR) of a multi-carrier signal, each carrier of the multi-carrier signal having a respective center frequency and a channel bandwidth (CBW), the method comprising:
   positioning a baseband version of each of the carriers to a frequency separation between adjacent carriers of at least 2 CBW,
   thereafter, combining the positioned carriers into a composite signal,
   clipping the composite signal,
   repositioning each carrier of the clipped composite signal back into a baseband version centered at zero frequency, and
   positioning each carrier at their respective center frequency.

2. The method according to claim 1, wherein said clipping adds clipping distortion signal components to each carrier of the clipped composite signal.

3. The method according to claim 1, further comprising, after repositioning each carrier of the clipped composite signal back into a baseband version centered at zero frequency, filtering clipping distortion outside each carrier's channel bandwidth.

4. The method according to claim 1, further comprising after clipping the composite signal:
   separating out clipping distortion, and
   after repositioning clipping distortion of each carrier of the clipped composite signal back into a baseband version centered at zero frequency:
   filtering clipping distortion outside each carrier's channel bandwidth, and
   adding the filtered clipping distortion to the respective base band version of each carrier centered at zero frequency.

5. The method according to claim 1, further comprising iteratively applying the method.

6. The method according to claim 1, further comprising grouping the center frequencies of the carriers of the crest factor reduced multi-carrier signal into a plurality of frequency bands, each frequency band comprising a single carrier or a plurality of carriers, the edges of the frequency bands being separated in frequency by 0 Hz to several GHz.

7. The method according to claim 1, wherein positioning each carrier at their respective center frequency, includes analog RF up-conversion, digital complex frequency tuning, or a combination of both.

8. The method according to claim 1, wherein the multi-carrier signal comprises three or more carriers.

9. An apparatus for crest factor reduction (CFR) of a multi-carrier signal, each carrier of the multi-carrier signal having a respective center frequency and a channel bandwidth (CBW), the apparatus comprising processing circuitry configured to:
   position a baseband version of each of the carriers to a frequency separation between adjacent carriers of at least 2 CBW,
   thereafter, combine the positioned carriers into a composite signal,
   clip the composite signal,
   reposition each carrier of the clipped composite signal back into a baseband version centered at zero frequency, and
   position each carrier of the crest factor reduced multi-carrier signal at their respective center frequency.

10. The apparatus of claim 9, wherein the processing circuitry configured to clip the composite signal is configured to add clipping distortion signal components to each carrier of the clipped composite signal.

11. The apparatus of claim 10, wherein the processing circuitry is further configured to, after repositioning each carrier of the clipped composite signal back into a baseband version centered at zero frequency, filter clip distortion outside each carrier's channel bandwidth.

12. The apparatus of claim 11, wherein the processing circuitry configured to clip the composite signal is further configured to, after clipping the composite signal:
separate out clipping distortion, and
after repositioning clipping distortion of each carrier of the clipped composite signal back into a baseband version centered at zero frequency:
filter clipping distortion outside each carrier's channel bandwidth, and
add the filtered clipping distortion to the respective base band version of each carrier centered at zero frequency.

13. The apparatus of claim 9, wherein the processing circuitry is further configured as a plurality of sequential replicated stages.

14. The apparatus of claim 9, wherein the processing circuitry is further configured to group the center frequencies of the carriers of the crest factor reduced multi-carrier signal into a plurality of frequency bands, each frequency band comprising a single carrier or a plurality of carriers, the edges of the frequency bands being separated in frequency by 0 Hz to several GHz.

15. The apparatus of claim 9, wherein the multi-carrier signal comprises three or more carriers.

16. The apparatus of claim 9, wherein the processing circuitry configured to reposition each carrier is further configured to reposition each carrier of the crest factor reduced multi-carrier signal at their respective center frequencies by analog RF up-conversion, digital complex frequency tuning, or a combination of both.

17. An transmitter for crest factor reduction (CFR) of a multi-carrier signal, each carrier of the multi-carrier signal having a respective center frequency and a channel bandwidth (CBW), the transmitter comprising processing circuitry configured to:
position a baseband version of each of the carriers to a frequency separation between adjacent carriers of at least 2 CBW,
combine the positioned carriers into a composite signal,
clip the composite signal,
reposition each carrier of the clipped composite signal back into a baseband version centered at zero frequency, and
filter clipping distortion outside each carrier's channel bandwidth, and
reposition each carrier of the clipped composite signal to their respective center frequencies.

18. The transmitter of claim 17, wherein the processing circuitry is further configured to:
separate out clipping distortion, and
add the filtered clipping distortion to the respective base band version of each carrier centered at zero frequency.

* * * * *